United States Patent

[11] 3,588,148

| [72] | Inventor | Robert Barsumian<br>P.O. Box 431, La Canada, Calif. 91011 |
|---|---|---|
| [21] | Appl. No. | 855,207 |
| [22] | Filed | Sept. 4, 1969 |
| [45] | Patented | June 28, 1971 |

[54] NONKINK TRANSITION TUBE
6 Claims, 4 Drawing Figs.

[52] U.S. Cl............................................... 285/8,
138/109
[51] Int. Cl........................................ F16l 11/00
[50] Field of Search........................................ 285/8;
138/123—125, 109

[56] References Cited
UNITED STATES PATENTS
3,366,404 1/1968 Lloyd........................... 285/8

3,403,960 10/1968 Ballard et al.................. 138/109X
FOREIGN PATENTS
265,557 7/1964 Australia...................... 285/8
470,296 12/1950 Canada........................ 285/8

Primary Examiner—J. Karl Bell
Attorney—Huebner & Worrel

ABSTRACT: Nonkink transition tube adapted for coupling a hose to the bib nozzle of a faucet to eliminate kinking of the hose adjacent its intake end and comprising a flexible but relatively stiff section of a tubular construction with end fittings suitable for connecting at one end to a bib nozzle and at the other end to a fitting on a hose and of such length as to stiffly yield without kinking when the hose is drawn away or swung around in its ordinary manipulation.

PATENTED JUN28 1971 3,588,148

INVENTOR.
ROBERT BARSUMIAN
BY Huebner & Worrel
ATTORNEYS.

3,588,148

NONKINK TRANSITION TUBE

BACKGROUND OF THE INVENTION

It is well known that when a hose, as for example, a garden hose, is coupled to the bib nozzle of a faucet or stopcock and the hose is pulled away to extend it for use, it frequently kinks in a region adjacent the nozzle. This becomes more aggravated as the hose structure deteriorates from use or age. It often results in a stoppage or at least a restriction of waterflow. Sometimes a cracking or splitting of the hose occurs and sometimes the attachment of the hose to its fitting is disturbed, which results in an undesirable leakage of water at the joint. As a result, hoses have been discarded in their entirety before their useful life otherwise has expired, or the worn or split end section has been cut off and a new fitting installed.

Some efforts have been made to solve this problem by the use of metallic swivel joints or wire reinforcements but they have proved to be either expensive or unsatisfactory.

SUMMARY OF THE INVENTION

The present invention is calculated to eliminate undue flexing of the hose at the end where it is connected to the water source.

This is achieved by interposing between the bib nozzle and the intake end of the hose a transition tube having an internal diameter at least as great as that of the hose, and provided with fittings at each end, one for coupling to the bib nozzle and the other for coupling to the hose. This element is made up of a plurality of plies of water impervious rubber or plastic and fabric combining to provide a laminated wall construction somewhat flexible but stiff enough (stiffer than the hose) to resist kinking under all conditions of use, and although relatively short, of such length as to permit pulling or twisting in a substantially universal bend or movement without diminishing the internal diameter or otherwise impeding the flow of water.

Thus, a standard hose, coupled to the transition tube, may be dragged around as desired and any angular pull at the end where it is connected to the member, will be dissipated in and through the member by reason of its response to the force exerted.

DESCRIPTION OF THE PREFERRED EMBODIMENT

Figure 1:
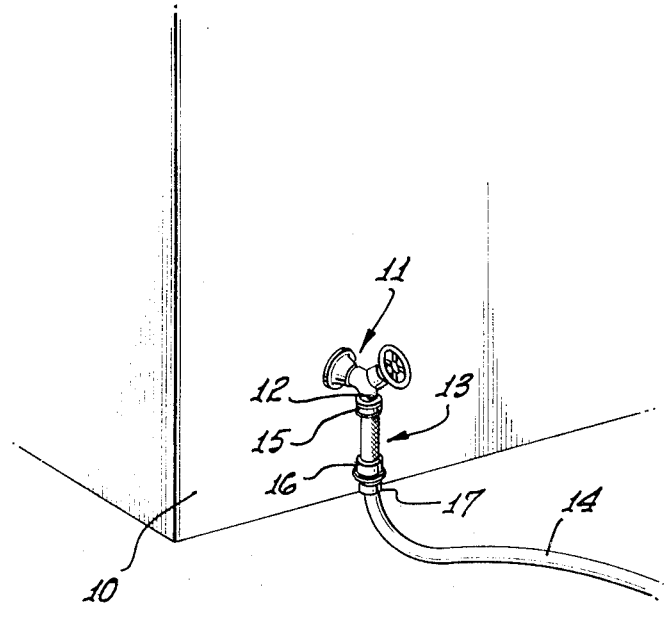
FIG. 1 is a perspective environmental view of an assembled faucet, nonkink transition tube and hose.

Referring to FIG. 1, a structure 10 is illustrated which may be, for example, the wall of a building. Protruding therethrough is any form of the standard faucet 11 which includes a bib nozzle 12 having standard threads thereon. The bib nozzle is of rigid material, usually metal.

The transition tube is shown generally at 13, and a standard hose, as for example, a garden hose, is shown at 14.

The transition tube includes an internally threaded fitting 15 for threaded attachment to the bib nozzle and an externally threaded fitting 16 at its other end for threaded attachment to a coupling member 17 on the end of the hose.

In this preferred embodiment, the transition tube 10 is formed of a laminated wall which includes an outer ply 24 made of a heavy durable weatherproof fabric. The innermost ply 26 is a braided fabric material such as rayon. Between the outer and inner fabric plies 24 and 26 respectively, are four plies 27, 28, 29 and 30 of rubber impregnated fabric. The term "rubber" as used here and in the claims includes substitutes, as for example, plastics possessing the primary characteristics of rubber.

The plies are laminated together by any suitable waterproof adhesive, including solvents, by vulcanizing, or other heat treatment.

The inside diameter of the tube 13 preferably should be as great as that of the hose 14. It is inconsequential whether the outer diameter of the member 13 is the same as or greater than that of the hose, but due to the multiplicity of plies, it usually will be greater.

The length of the tube 13 may vary somewhat, but its purpose would be destroyed if it is exceptionally short or exceptionally long. If too short, it would not have the flexibility required and if too long, its stiffness would interfere with convenient manipulation of the hose. It has been found that a length of approximately 12 inches used with a standard garden hose of an internal diameter ranging up to 1 inch, will function in the manner described and as desired. This measurement is by way of exaMple and not of limitation.

Figure 2:
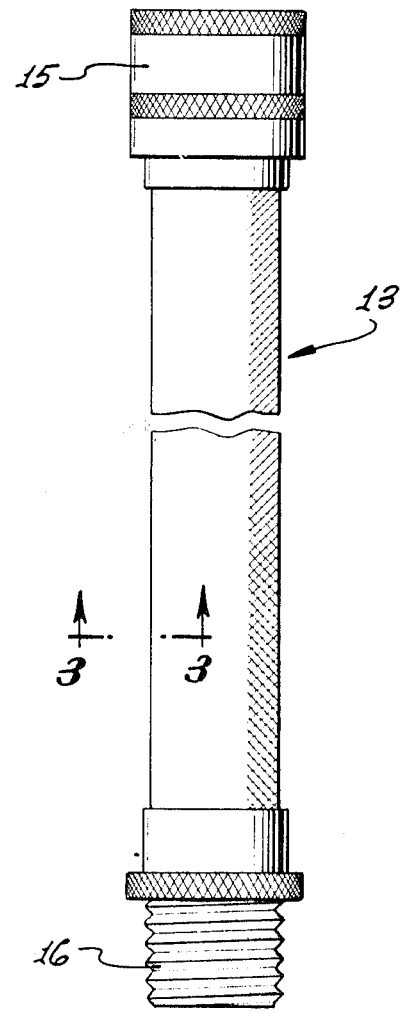
FIG. 2 is a side elevational view, enlarged, of the transition tube of FIG. 1.
Figure 4:
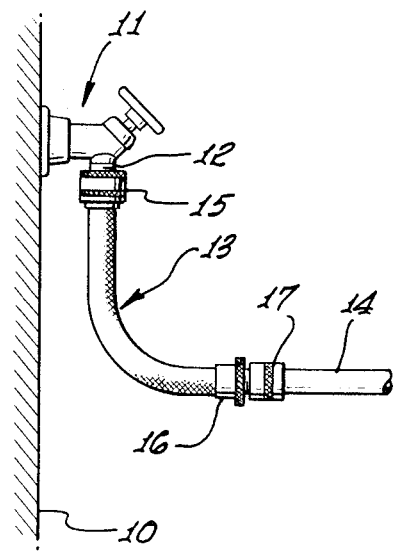
FIG. 4 is a side elevation of the assembly illustrated in FIG. 1, somewhat enlarged thereover, and illustrating the bending or twisting action of the transition tube when a hose is shifted as it might be in use.
Figure 3:
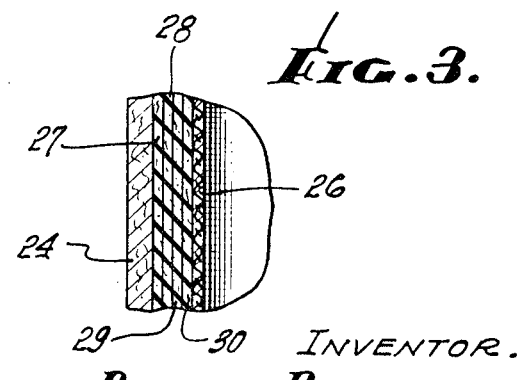
FIG. 3 is a fragmentary cross section taken on the line 3—3 of FIG. 2.

In use, the hose may be dragged, turned and pulled in any direction desired. The transition tube preferably will be formed axially straight as shown in FIG. 2 and when subjected to a pulling or twisting may assume the bend illustrated in FIG. 4, or a bend of some other configuration. Upon release of the pulling force, the member will ordinarily return to its approximately straight axial conformity shown in FIGS. 1 and 2.

The transition tube can be bent virtually double without kinking or imposing any bending stress on the hose. It will permit the full flow of water even at a double bend, and it will remain flexible even in subzero weather. The structure is such that it will not crack or break regardless of weather.

Although I have herein shown and described my invention in what I have conceived to be the most practical and preferred embodiment, it is recognized that departures may be made therefrom within the scope of my invention.

I claim:

1. A nonkink transition tube adapted to be interposed between a rigid liquid outlet member and a flexible hose and comprising a tubular member, means on each end of the tubular member for coupling with the outlet member and hose respectively, the tubular member being stiff but possessing a degree of flexibility less than that of the hose and being of a length great enough to permit bending of a magnitude adequate to accommodate the hose without any sharp bending of the latter in the vicinity of its connection to the tubular member when the hose is subjected to customary manipulation in use, the tubular member embodying a wall structure of such strength that it will not kink under the function defined.

2. A nonkink transition tube as defined in claim 1 wherein the tubular member comprises a plurality of laminations and has an internal diameter as great as that of the hose.

3. A nonkink transition tube as defined in claim 2 wherein the wall structure of the tubular member comprises outer and inner walls of fabric, and intermediate layers of rubber impregnated fabric, the walls and layers being bonded together.

4. A nonkink transition tube as defined in claim 1 wherein the tubular member is approximately 12 inches long with an internal diameter not exceeding approximately 1 inch.

5. A nonkink transition tube as defined in claim 3 wherein the tubular member is approximately 12 inches long with an internal diameter not exceeding approximately 1 inch.

6. The combination of a water faucet including a rigid nozzle bib with an externally threaded terminal, a garden hose with a threaded fitting at the intake end, a nonkink transition tube interconnecting the bib nozzle and the garden hose, said transition tube comprising a tubular member, threaded means on one end coupling the tubular member to the bib nozzle, threaded means on the opposite end coupling the transition tube to the garden hose, the tubular member being stiff but possessing a degree of flexibility less than that of the hose and being of a length great enough to permit universal bending of a magnitude adequate to accommodate the hose without any sharp bending of the latter in the vicinity of its coupling to the tubular member when the hose is subjected to customary manipulation in use, the tubular member embodying a wall structure of greater strength than that of the hose and sufficient that it will not kink under the function defined.